UNITED STATES PATENT OFFICE.

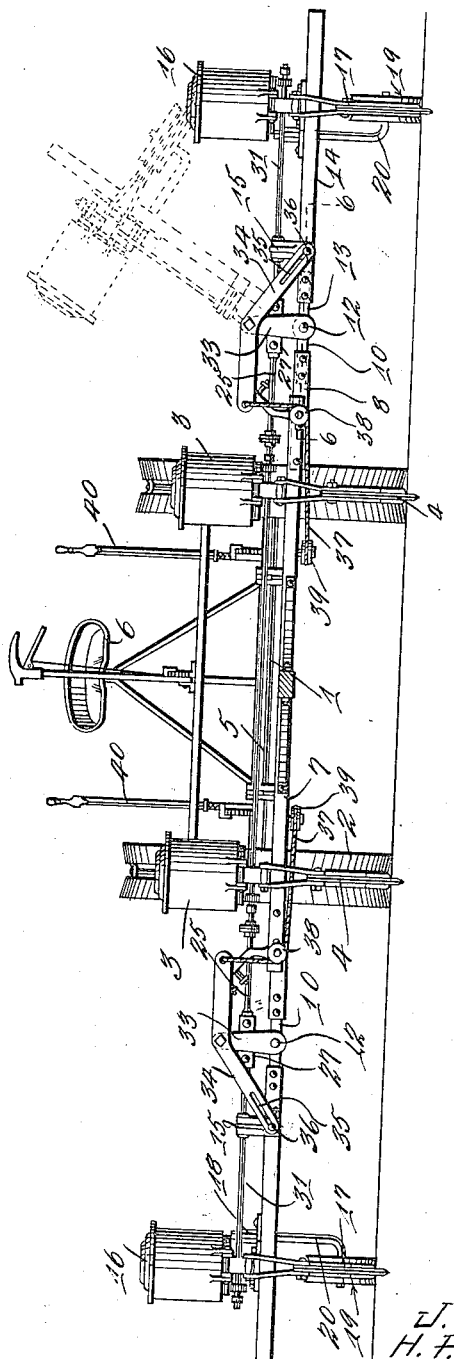

JAMES MOIR AND HARVEY P. McFARLAND, OF BURLINGTON, IOWA.

CORN-PLANTER ATTACHMENT.

1,215,960. Specification of Letters Patent. Patented Feb. 13, 1917.

Application filed January 21, 1916. Serial No. 73,456.

*To all whom it may concern:*

Be it known that we, JAMES MOIR and HARVEY P. McFARLAND, citizens of the United States of America, residing at Burlington, in the county of Des Moines and State of Iowa, have invented certain new and useful Improvements in Corn-Planter Attachments, of which the following is a specification, reference being had therein to the accompanying drawing.

This invention relates to corn planters and has for its object the production of a simple and efficient attachment for a corn planter which may be so carried by the planting device as to permit the attachment to be swung out of the way when so desired for permitting two, three or four rows of grain to be dropped according to the desire of the operator.

Another object of this invention is the production of a simple and efficient attachment which may be readily and conveniently attached to the common type of corn planter now in use without necessarily reconstructing the body of the planter.

Other objects and advantages of the present invention will appear throughout the following specification and claim.

In the accompanying drawings:—

The figure is a front elevation showing the attachment applied to a corn planter.

By referring to the drawings it will be seen that 1 designates the usual corn planter which is supported upon the usual supporting wheels 2. A plurality of seed dropping devices 3 are supported upon the main frame, and the seeding shoes 4 are likewise supported in proper position with respect to the seed dropping boxes. The usual control shaft 5 is employed in connection with the seed dropping devices for controlling the dropping of the seeds for planting in the usual manner. A suitable seat 6 is supported upon the main frame as is usual in such devices.

The main frame of the corn planter is provided upon the front thereof with a pair of parallel transversely extending supporting bars 7, which bars are preferably formed of the angle iron structure, or in other words substantially L-shape in cross-section. Each end of the parallel bars 7 supports an angle plate 8 which is fixedly secured thereto by means of the bolts, or any other suitable securing means. Arms 10 are supported by each plate 8, and these arms 10 are provided with journal portions through which a connecting shaft 12 passes. A plurality of additional arms 13 are also journaled upon the shaft 12, and these arms 13 are connected to the parallel angle bars 14 of the planter attachment frame. These arms 14 are connected by means of the cross-brace or bar 15.

A suitable seed box 16 is supported upon the parallel bars 14, and the ordinary planter shoe 17 of suitable construction is also supported adjacent thereto for the purpose of delivering the seed from the seed boxes 16.

A journal frame 18 is carried by the rear bar 14, and a supporting or trailer wheel 19 is carried by an arm 20, fitting in the journal portion 18. It should be understood that this arm 20 may be so adjusted as to regulate the depth of the shoe passing into the ground.

The seed dropping or operating shaft 5 is actuated in the usual manner.

The extension frame of the planter is provided with a shaft 25 secured to the shaft 5 and is provided with an enlarged head 26 pivotally connected to a pair of parallel plates 27 by means of a pivotal bolt 28. The plates 27 are also connected at their opposite ends to the pivotal bolt 29, which bolt 29 passes through the head 30 of the auxiliary section 31 of the shaft 25. This auxiliary section 31 of the shaft 25 passes through a journal portion 32 carried by the brace or bracket 15. The shaft 25, of course, coöperates with the seed dropping box 16 in the usual manner.

A supporting standard 33 is carried by the shaft 12 at one end thereof, and this standard 33 carries an angle lever 34, the lever 34 being pivotally mounted upon the top of the standard 33. This lever 34 is provided with a longitudinally extending slot 35 near one end thereof through which passes a pin 36 carried by one of the parallel arms or bars 14 of the attachment or extension for the planter. The opposite end of the lever 34 is connected to a lifting cable 37, which cable 37 passes over a pulley 38 carried by the parallel members 7 of the main frame of the planter, and the cable also passes around a pulley 39 to one of the operating levers 40 placed adjacent the seat 6 so as to permit the operator to raise the extension or attachment of the corn planter to the position shown in dotted lines or to a complete vertical position in order that the planter may readily pass an obstruction or be swung upwardly for the purpose of convenient transportation from place to place.

From the foregoing description it will be seen that a very simple and efficient means has been produced whereby either or both of the extensions of the corn planter may be raised so as to be thrown to an inoperative position in order to allow the planter to pass an obstruction when so desired by means of operating the levers 40. It should be understood that each attachment is similarly constructed, and it is only thought necessary to go into a detail description of one of the attachments adapted to be attached to the machine at one end thereof.

Having thus described the invention what is claimed as new, is:—

In a corn planter of the class described, the combination with a main frame, of an extension frame secured to said main frame, a standard interposed between said main frame and said extension frame, an angle lever pivotally secured upon said standard, said angle lever provided with a horizontally extending end and a downwardly inclined end, means for securing said downwardly inclined end to said extension frame for permitting the swinging of said extension frame upwardly as said angle lever is swung, and means secured to said horizontally extending end for swinging said angle lever to the desired position.

In testimony whereof we hereunto affix our signatures.

JAMES MOIR.
HARVEY P. McFARLAND.

Copies of this patent may be obtained for five cents each, by addressing the "Commissioner of Patents, Washington, D. C."